US006301988B1

(12) United States Patent
Brogårdh

(10) Patent No.: US 6,301,988 B1
(45) Date of Patent: Oct. 16, 2001

(54) DEVICE FOR RELATIVE MOVEMENT OF TWO ELEMENTS

(75) Inventor: Torgny Brogårdh, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/142,581

(22) PCT Filed: Mar. 14, 1997

(86) PCT No.: PCT/SE97/00434

§ 371 Date: Nov. 30, 1998

§ 102(e) Date: Nov. 30, 1998

(87) PCT Pub. No.: WO97/33726

PCT Pub. Date: Sep. 18, 1997

(30) Foreign Application Priority Data

Mar. 14, 1996 (SE) .................................... 9600999

(51) Int. Cl.[7] .................................................. B23Q 1/25
(52) U.S. Cl. ........................................ 74/490.03; 414/917
(58) Field of Search ........................ 414/917; 74/490.03, 74/89.14; 901/23

(56) References Cited

U.S. PATENT DOCUMENTS

| | | | | |
|---|---|---|---|---|
| 4,329,110 | * | 5/1982 | Schmid | 414/917 X |
| 4,329,111 | * | 5/1982 | Schmid | 414/917 X |
| 4,976,582 | | 12/1990 | Clavel | 414/729 |
| 5,156,062 | | 10/1992 | Appleberry | 74/479 |
| 5,386,741 | | 2/1995 | Rennex | 74/490.05 |
| 5,575,597 | * | 11/1996 | Bailey | 74/89.15 X |
| 5,715,729 | * | 2/1998 | Toyama | 74/490.03 |
| 5,960,672 | * | 10/1999 | Pritschow et al. | 74/490.03 X |

FOREIGN PATENT DOCUMENTS

| | | |
|---|---|---|
| 1505-775-A | 9/1989 | (SU) . |
| 1549-746-A | 3/1990 | (SU) . |
| 1691092-A1 | 11/1991 | (SU) . |

* cited by examiner

*Primary Examiner*—David A. Bucci
*Assistant Examiner*—Colby Hansen
(74) *Attorney, Agent, or Firm*—Connolly Bove Lodge & Hutz

(57) ABSTRACT

A device for relative movement of two elements comprises two link arrangements coupled in series using a connection arrangement. A first link arrangement comprises at least three links which are substantially equal in length and parallel. The links are positioned in a substantially triangular relation viewed along the longitudinal direction of the links, between the connection arrangement and a second of the elements. A second link arrangement comprises at least one parallelogram acting between the connection arrangement and a first of the elements. First and second force applying arrangements are adapted to cause the first link arrangement to pivot. A third force applying arrangement is adapted to cause the second link arrangement to pivot.

19 Claims, 13 Drawing Sheets

DEVICE FOR RELATIVE MOVEMENT OF TWO ELEMENTS

FIELD OF THE INVENTION

This invention relates to a device for relative movement of two elements comprising an arrangement for forming a connection between a first link arrangement and a movement arrangement. The movement arrangement is provided between the connection arrangement and one of the elements whereas the first link arrangement is provided between the connection arrangement and a second of the elements. The first link arrangement comprises at least two first links connected relative to the connection arrangement and associated elements via joints so as to be pivotable in all directions. First links form, together with the connection arrangement and the associated elements, a first four-links system. The movement arrangement is adapted to allow relative movement between the connection arrangement and the associated elements, and force applying arrangements actuate the link arrangement and the movement arrangement so as to change the relative position between the elements.

The relative movement of the two elements has the purpose to position them mutually in a manner aimed at by means of the force applying arrangements. More specifically, the device according to the invention is intended to form a manipulator or robot. The second of the elements is intended to carry, directly or indirectly via a carrying arrangement, a working member to execute the function aimed at, for instance picking, placing, packing and palletizing. However, the working member may also be adapted to carry out other work operation than those just mentioned. The first element may according to a first embodiment form a base member secured in space but could according to a second embodiment form at least a part of a carrier moveable relative to a base member. A force applying arrangement then serves for adjusting the position of the carrier relative to the base member.

BACKGROUND OF THE INVENTION

A robot of the kind defined by way of introduction is described in U.S. Pat. No. 4,976,582. For the positioning of the second element, the robot comprises three force-applying arrangements, which in unison comprise three force-exerting members arranged in a triangular distribution on the first element. Each of the force members is connected to the movable second element via its own connection comprising two link arrangements and an intermediate connection arrangement. These three connections coupled in parallel are likewise arranged in a triangular configuration. Each of these connections comprises a first link arrangement including two first links pivotably connected to the second element and a second link, which is rigidly connected to a movable portion of the force-exerting member and by means of a connection arrangement is connected to the two first links. The second link is movable with regard to one single degree of freedom relative to the stationary portion of the power-exerting member. The connection arrangement connects the first and second links in a hinged manner with no more than two degrees of freedom. The link arrangement formed by the first links is connected to the second element so that two but not more than two degrees of freedom occur. The first link arrangements form parallelogram-shaped four-links systems. A disadvantage with this known type of robot is that it becomes comparatively bulky as a consequence of the triangular configuration discussed herein above. The angle between planes of pivoting of two adjacent second links must, always be less than 180°. Thus, it is very difficult to arrange two or more of those robots closely to each other without collision. A further disadvantage is that it is structurally difficult to design the known robot with the required stiffness and strength since the movable portions of the three power-exerting members project in a star-like fashion from the first element, which regarding the space requirement should be formed as small as possible but on the other hand must be able to receive the power-exerting members. Thus, it becomes difficult to design arms rigidly connected to the movable portions of the power-exerting members with a sufficient width as far as the arms themselves are concerned as well as their bearings at the first element.

A further disadvantage is that all arm lengths must be equal. This means that it is not possible to optimize the robot to the pattern of movement in question. Performance will always be symmetrically distributed in a symmetrical working area, which is not cost efficient.

Also, the known robot cannot execute a tilt movement of the second element to fetch objects located sidewardly of or above the robot.

In addition, three further motors are required in order to change the inclination of the second element. It would be desirable to manage this with only one extra motor in order to achieve a cost-efficiently.

As a consequence of the equilateral triangular construction of the known robot it is also difficult for arrange to work horizontally above conveyors, loading pallets etc. Furthermore, if a working member on the second element is to be driven by means of a motor on the first element, an axle extending between the first and second elements must comprise a torque-transmitting coupling allowing variation of the length of the axle. In practice, the axle is suitably designed as consisting of two axle parts, which are displaceable telescopically relative to each other and the torque transmission of which is ensured by splines, wedge grooves or similar. This complicates the embodiment and makes it more costly.

SUMMARY OF THE INVENTION

This invention aims at devising routes to develop the device of the kind defined by way of introduction so as to eliminate or at least reduce one or more of the disadvantages mentioned herein above. A particular aim is to provide a greater flexibility in the design of the device so that two or more devices may be placed to work comparatively close to each other.

The object of the invention is achieved in that the first link arrangement comprises at least one third link connected via joints relative to the connection arrangement and associated elements so as to be pivotable in all directions, and that the joints of the first and third links are disposed in a triangular configuration.

Thus, the first link arrangement forms an interconnection between the connection arrangement and the associated elements by means of at least three links. This creates possibilities for an asymmetrical design of the device according to the invention and an adjustment of the working area according to a desired application. For instance, this asymmetrical character of the device according to the invention provides possibilities for a very dense packing of a plurality of robots in a manner which will be explained in the following. This differs the device of the present invention from the device described in U.S. Pat. No. 4,976,582, where a triangular structure with equal sides is aimed at and where in any case the angle between the planes of pivoting of two adjacent second links must always be less than 180°.

It is preferred that the movement arrangement is designed as a second four-links system. Thus, the first and second four-links systems will be coupled in series with each other via the connection arrangement. This provides the device with very favorable operational qualities. A particularly advantageous option resides in the second four-links system being possible to use for achieving tilting of the working tool by means of a force-applying arrangement comprising one single force-exerting member.

The use of two four-links systems coupled in series via the connection arrangement involves, in addition, in case the four-links systems are designed as parallelograms, that it is possible to achieve force transmission via axles provided in the four-links systems and with assistance of cardan joints and/or angular gears without having to introduce, in the axle sequence, any sliding couplings or similar intended to operate the axle length compensating.

Several preferable developments of the invention are defined in the dependent claims. These development and advantages in connection with the invention are dealt with more specifically in the following description.

BRIEF DESCRIPTION OF THE DRAWINGS

With reference to the enclosed drawings a more close description of embodiments of the invention follows hereunder.

In the drawings.

DETAILED DESCRIPTION OF PREFERRED EMBODIMENTS

Figure 1:
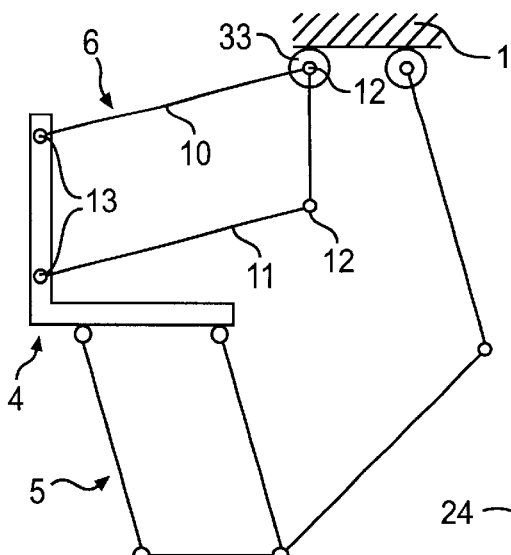
FIG. 1 is a side view of a robot according to the invention in a diagrammatical form.

In order to simplify the understanding, like reference characters have been used in following in different embodiments for similar or corresponding components but with addition of letters specific to embodiments.

The robot illustrated in FIGS. 1–4 is intended for relative displacement of two elements 1, 2. The element 1 is in this example intended to form a base member, relative to which the element 2 is intended to be positioned in space The element 2 is intended to carry, either directly as indicated in FIG. 1, or, as will be dealt with later, indirectly via a carrying arrangement, a working member 3.

The robot comprises an arrangement 4 for forming a connection between a link arrangement and a movement arrangement 6. The link arrangement S is provided between the connection arrangement 4 and the second element 2 whereas the movement arrangement 6 is provided between the connection arrangement 4 and first element 1. The link arrangement 5 comprises at least two first links 9 pivotably connected relative to the connection arrangement 4 and the element 2 via joints 7 and 8 respectively, the first links forming, together with the connection arrangement 4 and the element 2 a first four-links system FS1. The joints 7, 8 of each of those links 9 are designed such that the link in question becomes pivotable in all directions relative to both the connection arrangement 4 and the element 2.

The movement arrangement 6 is adapted to allow relative movement between the connection arrangement 4 and the first element 1. More specifically, the movement arrangement 6 is intended to be used for movement of the connection arrangement 4 relative to element 1. It is then preferred that the movement arrangement 6 is adapted to maintain, on such relative displacement between the element 1 and connection arrangement 4, a substantially constant relation between themselves as far as inclination is concerned. Expressed in other words, the connection arrangement 4 is intended to be moved, on operation of the movement arrangement 6, relative to the element 1 without changing the orientation of the connection arrangement 4 in space. As an example of movement arrangements 6, those capable of achieving linear movements, for instance piston cylinder mechanisms, ball screw arrangements and rack driving devices may be mentioned. By such linear displacement the constant orientation of the connection arrangement 4 is ensured. However, it is pointed out that also types of movement arrangements may be in question.

According to a particularly preferred embodiment of the invention, the movement arrangement 6 is designed as a second link arrangement comprising at least one second link 10 pivotable relative to the connection arrangement 4 and the first element 1. It is then particularly preferred that the link arrangement 6 comprises at least two second links 10, 11 pivotable relative to the connection arrangement 4 and the first element 1. The link arrangement 6 forms with its links 10, 11 and together with the connection arrangement 4 and the element 1 a second four-links system FS2. The joints of the links 10, 11 relative to element 1 are denoted 12 whereas the joints relative to the connection arrangement 4 are denoted 13 (see FIG. 1).

It is preferred that the joints 12, 13 in the four-links system FS2 allow one single degree of freedom, i.e. a pure pivoting movement about pivoting axes parallel to each other. Thus, the four-links system FS2 will pivot in parallel planes.

The link arrangement 5 comprises at least one third link 14 pivotably connected relative to the connection arrangement 4 and the element 2 via joints 15 and 16 respectively. The joints 7, 15; 8, 16 of the first and third links 9, 14 are disposed in a triangular configuration. A right-angled triangular configuration is illustrated in FIGS. 1–4 whereas in FIGS. 26 and 27 a triangular configuration is illustrated having all angles smaller than a right angle. The minimum criterion in this respect is that the joints form the triangular configuration, i.e. that the joints are not located in one and the same plane. The triangular configuration means that the links 9, 14 will carry the element 2 in at least three points.

The link 14 forms with each of the links 9, the connection arrangement 4 and the element 2 a third four-links system FS3. Accordingly, two four-links systems FS3 are involved in the example. It is pointed out that of course more than one link 14 may occur. More four-links systems FS3 are then of course formed. Besides, more than two links 9 may occur so that, accordingly, more four-links systems FS1 are formed.

The links 9 are substantially equal in length. In addition, they are substantially parallel. Thus, the four-links system FS1 forms a parallelogram.

The links 10, 11 are substantially equal in length. They are also preferably substantially parallel. Thus, also the four-links system FS2 forms a parallelogram.

The link 14 is substantially equal in length to the links 9. Besides, the link 14 is preferably substantially parallel to the links 9. Each of the two four-links systems FS3 occurring in the example forms, accordingly, parallelograms. It is pointed out that in case several links 14 occur, they should be substantially equal in length to the links 9 and substantially parallel thereto. It is pointed out that the link arrangements 5 and 6 in the example are connected by means of the connection arrangement 4 so that an angle α, more specifically, a substantially right angle, is present between a plane P1 through the joints 7 and 15 and a plane P2 (see FIG. 3) intersecting the joints 13 and extending perpendicularly to the plane of pivoting of the links 10, 11. As will appear in the following, the angle may, however, be arbitrary within the interval of 0–360°. In the embodiment illustrated and having an angle of about 90°, the connection arrangement 4 will, viewed from the side according to FIGS. 1 and 3–4, comprise a substantially L-like shape. In the orientation according to the figures the connection arrangement 4 comprises, viewed from the side, a substantially vertical shank and a substantially horizontal shank. The vertical shank is coupled to the links 10, 11 whereas the horizontal is coupled to the links 9 and 14. The horizontal shank may have, as viewed from above, an angled shape with two legs, one of which extends along FS1 whereas the other extends along one of FS3.

The links 9, 14 of the first link arrangement 5 and the joints 7, 8 and 15, 16 respectively belonging thereto form connections between the connection arrangement 4 and the second element 2, which all allow relative rotation about axes substantially parallel to the links. Such an embodiment presupposes that the joints 7, 8, 15, 16 give three degrees of freedom, namely the previously discussed pivoting about two real or virtual axes at an angle to each other plus the rotation about axes parallel to the links 9, 14. Such a design has the advantage that the links 9, 14 and their joints do not have to be dimensioned in order to adopt rotational strains. An example of design of the joints for this purpose is ball joints. However, it is pointed out that the minimum criterion for functionality according to the invention as far as the joints 7, 8 and 15, 16 are concerned is that they should provide freedom for the links 9, 14 to pivot in all directions in relation to the connection arrangement 4 and the second element 2, i.e. that two degrees of freedom in the form of pivoting about two axes forming an angle between themselves must occur. When not more than two degrees of freedom in this way are present, the links and their joints are capable of transferring rotational strains about axes parallel to the links. In such a case the joints could consist of cardan joints or other joints having double, non-parallel pivot axes. Such designs will be discussed more closely in the following in connection with the embodiments according to FIGS. 13–14, 24–25 and 28–29.

First 17 and second 18 force applying arrangements are adapted to cause the links 9, 14 in the link arrangement 5 to pivot relative to the connection arrangement 4. The arrangements 17, 18 comprise each a power exerting member 19 and 20 respectively having a stationary portion rigidly connected relative to the element 1 and a movable portion 21 and 22 respectively having one single degree of freedom relative to the stationary portion and being connected to the element 2 via a respective link arm arrangement 23, 24. The force applying arrangements 17, 18 are adapted to actuate the element 2 in mutually different directions to adjust the same in space.

The link arm arrangement 23 in the force applying arrangement denoted 17, comprises at least two link arms 26, which are hingedly connected to the element 2 via joints 27 and to the movable portion 21 via joints 29. Each of these joints 27, 29 should be designed so as to allow pivoting of the individual link arm 26 in all directions relative to the second element 2 and movable portion 21, i.e. that at least two degrees of freedom should be present, the possibility for pivoting about double, non-parallel pivoting axes. The joints may, thus, in this case consist of cardan joints or other two axes joints. In addition, it is included within the scope of the invention that each of the joints 27, 29 may comprise a further degree of freedom relative to the element 2 or the movable portion 21, namely rotation about an axis substantially parallel to the link arm 26 in question. In such a case the joints may for instance be formed by ball joints.

The link arm arrangement 23 comprises in the example a third linkarm 28, which is connected to the link arms 26 via the joints 29. On the other hand, the link arm 28 is rigidly connected to the movable portion 21 or alternatively connected to the portion 21 via a joint 30 comprising one single degree of freedom, i.e. in practice pure rotation.

The link arms 26 form, together with the associated joints 27, 29, a four-links system. It is preferred that this system is designed as a parallelogram.

Since the movable portion 21 presents only one degree of freedom relative to element 1, the link arm 28 will maintain its orientation in space. The parallelogram structure formed by the link arm and the link arms 26 in combination with the element 2 involves, accordingly, that the force applying arrangement 23 in its entirety will lock the second element 2 against pivoting relative to the connection arrangement 4 about axes substantially perpendicular to planes, in which joints 7, 15; 8, 16 present at the ends of the links 9, 14 reside. This characteristic of the link arm arrangement 23 involves, accordingly, that the element 2 will be locked in space, provided that FS2 is lockable, as far all degrees of freedom are concerned, except for one further, which accordingly must be provided by the second force applying arrangement 18.

The only remaining degree of freedom may be locked in case the link arm arrangement 24 comprises one single link arm 31, which is connected to the movable portion 22 and the second element 2 via joints 32. These joints should be designed so that the link arm 31 is pivotable in all directions relative to the movable portion 22 as well as to element 2. In addition, the joint 32 could allow one further degree of freedom in the form of rotation about an axis parallel to the link arm 31 relative to the movable portion 22 and the element 2. In the latter case, three degrees of freedom would be at hand. Thus, the joints 32 could consist of cardan joints, other joints allowing pivoting about double, non-parallel axes, universal joints, ball joints etc. An alternative to the design of the link arm arrangement 24 as consisting of one single link arm 31 is to design the same analogous to the link arm arrangement 23. This is not necessary in order to achieve locking of all degrees of freedom but may be desirable in certain cases due to the extra stability achieved with double link arms.

It is pointed out that hereinafter joints allowing one single degree of freedom at times will be indicated by means of an oval (see the joint 30) in perspective views whereas joints with two or more degrees of freedom are indicated with a circle.

The power exerting member 19 and/or 20 is, in the example, formed by a rotary means, the stator of which forms the stationary portion and the rotor of which forms or is included in the movable portion 21 and 22 respectively. In the example, the movable portion 21, 22 has the character of an arm pivotable with one degree of freedom. However, it is pointed out that the movable portion 21 and 22 respectively could also be movable as far as one single other degree of freedom is concerned, for instance translation. Such portion 21, 22 movable in translation would then in similar manner be connected, by means of its extreme end, to the link arm arrangement 23 and 24 respectively.

A third force applying arrangement 33 is adapted to cause the second links 10, 11 to pivot relative to the element 1. The arrangement 33 comprises a power exerting member having a stationary portion rigidly connected relative to the first element 1 and a movable portion which is connected to the link denoted 10. The power exerting member 33 is suitably formed by a rotary means, the stator of which forms the stationary portion and the rotor of which is rigidly connected to the link 10.

As far as the robot has been described until now and based on FIG. 1, pivoting of the links 10, 11 by means of the force member 33 causes the connection arrangement 4 to be moved in space in a parallel manner while maintaining its orientation and the corresponding is relevant as to the element 2 by intermediary of the link arrangement 5.

However, the robot comprises a design, by means of which the element 2 may be changed as far as its orientation is concerned, i.e. tilted, and this more specifically as a consequence of a change of form of the link arrangement 6. For this purpose the first element 1 is formed by two parts 1a and 1b, which are hingedly connected to each other about an axis coinciding with the hinge axis 12 of the link 10. A fourth force applying arrangement 34 is adapted to pivot the second part 1B relative to a first 1A of the parts. This second part 1B forms a link in the four-links system FS2 in that it is hingedly connected to the two other links 10, 11. The arrangement 34 comprises a power exerting member having a stationary portion rigidly connected to the element part 1A and a movable portion rigidly connected to the part 1B. More specifically, the power member 34 is formed by a rotary means, the stator being connected to the part 1A and the rotor of which is connected to the part 1B.

When the force member 33 is immobilized, the link 10 assumes one and the same position in space. When the force member 34 is driven, the part/link 1B will be pivoted in space and then also relative to the link 10. This gives rise to a deformation of the parallelogram FS2 such that the connection arrangement 4 and, accordingly, also the element 2 will be inclined as appears from FIGS. 3 and 4. Such inclination involves a further degree of freedom for a working member provided on the element 2. When the force member 34 is immobilized, the link/part 1B assumes, always, one and the same position relative to the part 1A, which means that then no tilting of the element 2 may occur but instead pivoting of the link 10 involves movement in the space of element 2 while maintaining a constant orientation.

Figure 2:
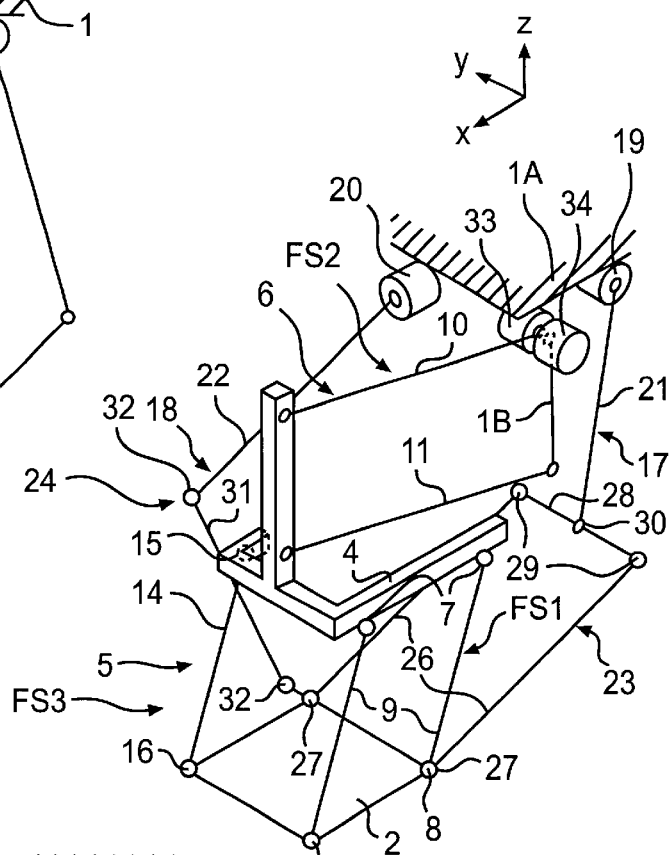
FIG. 2 is a diagrammatical view of the robot in perspective.
Figure 8:
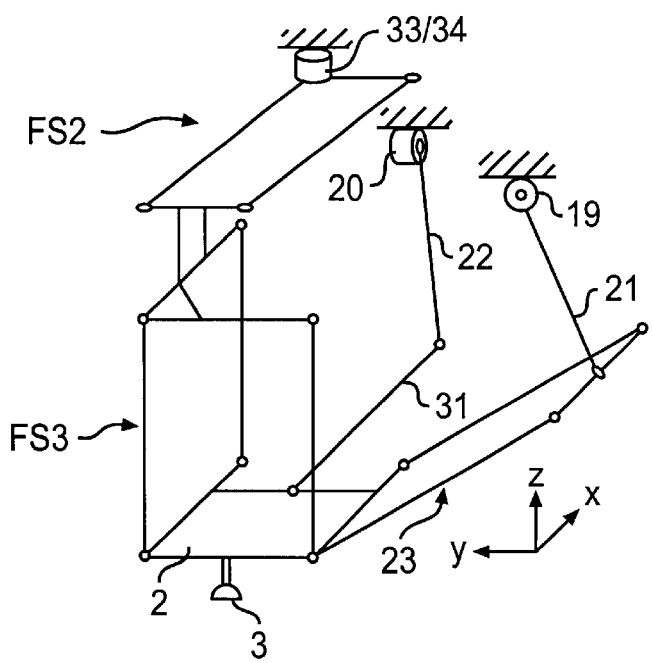
FIG. 8 is a diagrammatical view in perspective illustrating a variant of the preceding embodiment.

It appears from FIG. 2 that the element 2 may be moved in the plane XY by pivoting of the links 9, 14 by means of the force applying arrangements 17, 18. By pivoting the links 10, 11 the element 2 may be displaced in the XZ-plane. However, it is pointed out that it is well within the scope of the invention that the parallelogram FS2 works more or less obliquely relative to the XZ-plane. In FIG. 8 an extreme embodiment in this regard is shown, namely that the parallelogram FS2 works in the XY-plane. A very good degree of freedom in the XY-plane is then achieved but the embodiment would have to be completed with further freedom of movement in the XZ-plane in order to be more interesting in general sense. All kinds of orientations of FS2 so that it works in planes between the XY- and XZ-planes are possible.

Figure 5:
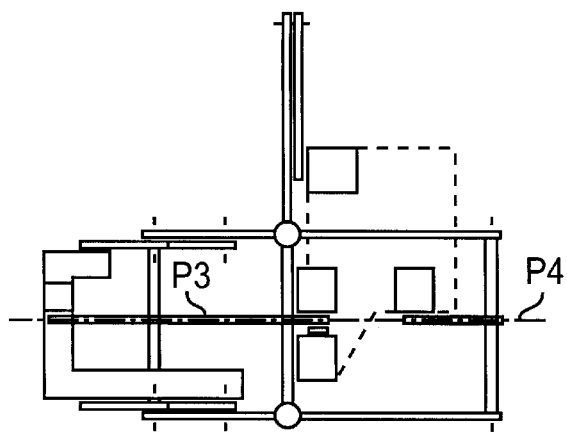
FIG. 5 is a view of a robot viewed from above.
Figure 6:
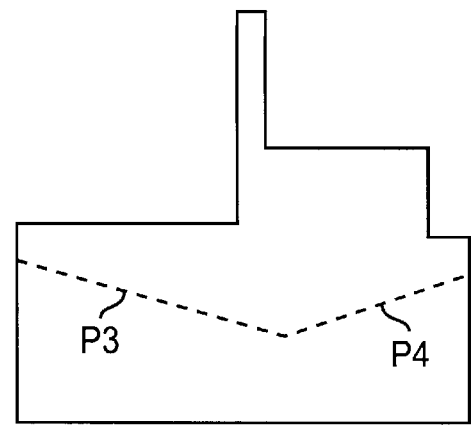
FIG. 6 is a plan view illustrating, in correspondence to FIG. 5, the space occupied by the robot.
Figure 7:
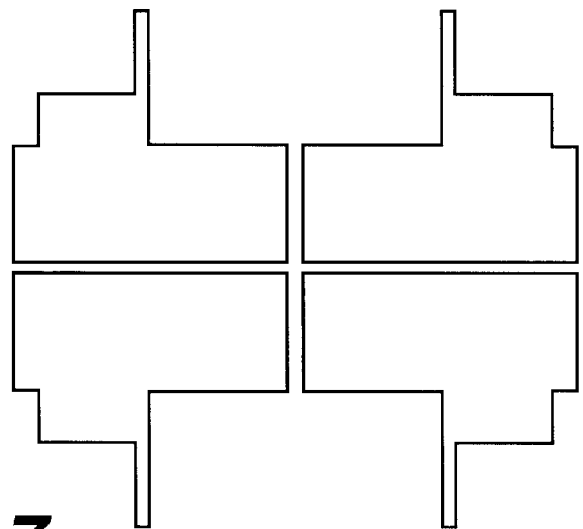
FIG. 7 is a plan view illustrating placement of four different robots to work close to each other provided that a mirror image variant of the robot illustrated in FIGS. 1–6 is produced.

The robot according to FIG. 2 is illustrated in plan view in FIG. 5, i.e. from above. The contours are more specifically drawn out in FIG. 6. As can be seen, the contour has a long straight side, which may be used by placement towards a corresponding side of another robot when there is a desire for a dense packing of a plurality of robots. For instance, a robot variant mirror-inverted relative to the one in FIG. 6 may be used for packing of four robots in the most dense packing as shown in FIG. 7.

Figure 3:
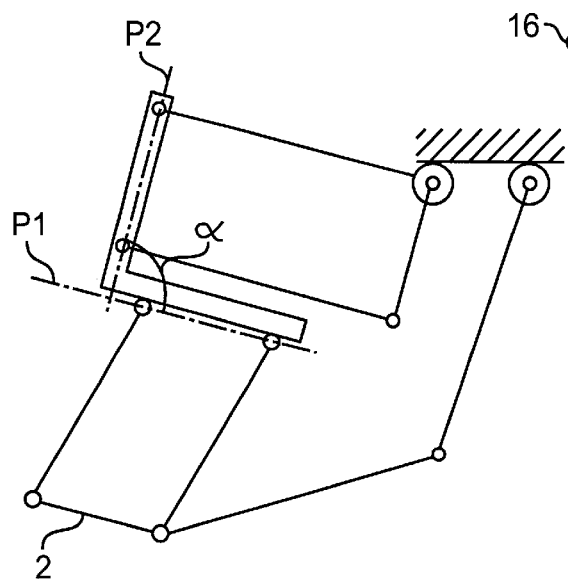
FIGS. 3 and 4 are views similar to FIG. 1 of the robot in different positions.
Figure 4:
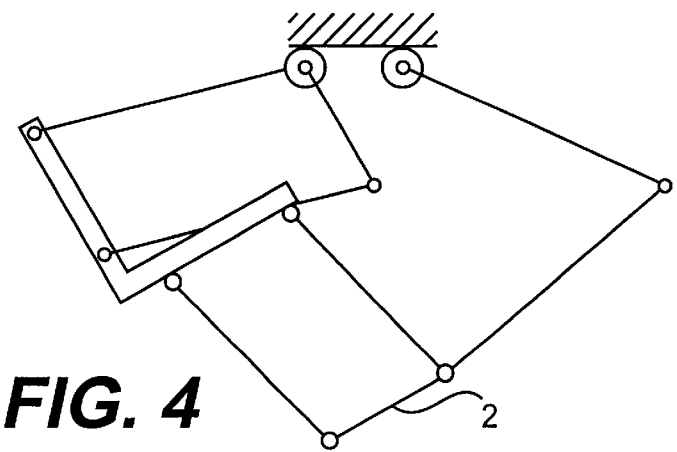
Figure 9:
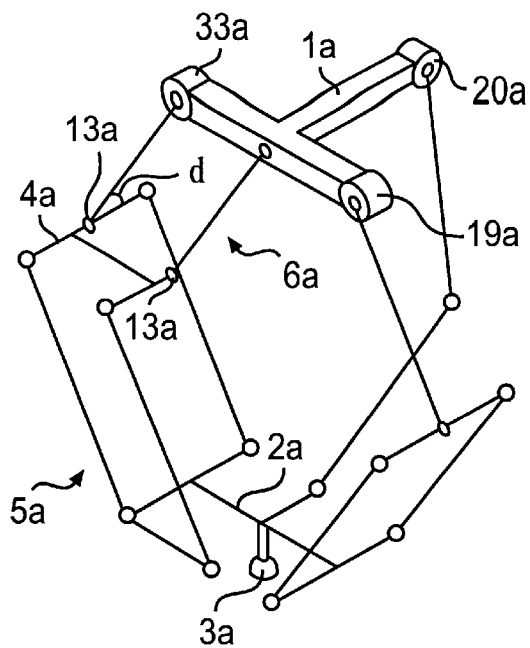
FIGS. 9 and 10 are perspective views of a further robot variant shown in two somewhat different positions.
Figure 10:
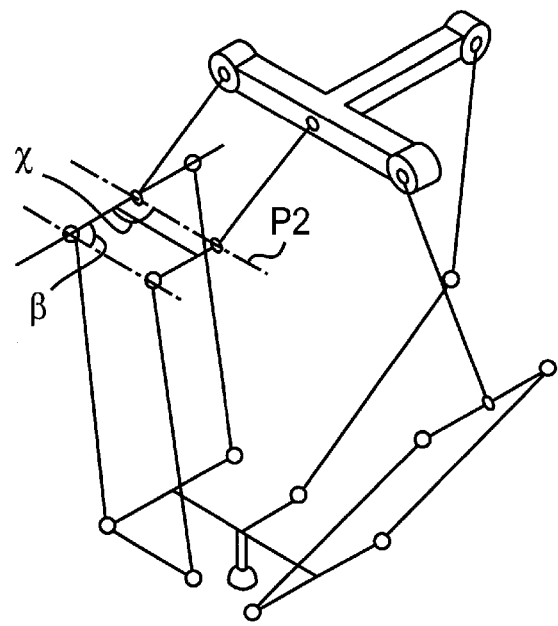
Figure 11:
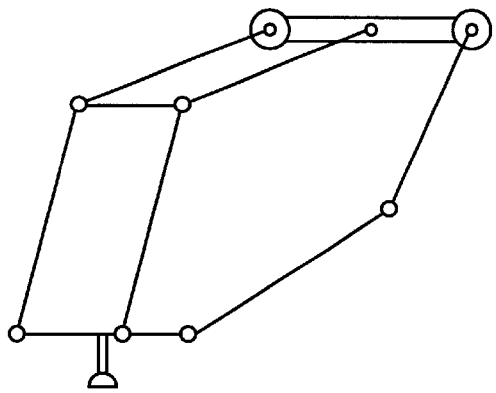
FIG. 11 is a side view of the robot according to FIGS. 9 and 10 in a different position.

A robot variant, which in its essential features corresponds to the one in FIGS. 1–4 is illustrated in FIGS. 9–11. The difference is generally speaking that the angle between the planes P1 and P2 in the embodiment according to FIGS. 9–11 and discussed with guidance of FIG. 3 is 0°. Besides, the two planes coincide in the latter embodiment or are possibly separated with a smaller distance, which in other embodiments may be much greater in case that is desired for obtaining a distance between the link arrangements 5a and 6a. For the rest, the first element 1a is illustrated in FIG. 9 as a T-shaped base member.

Figure 17:
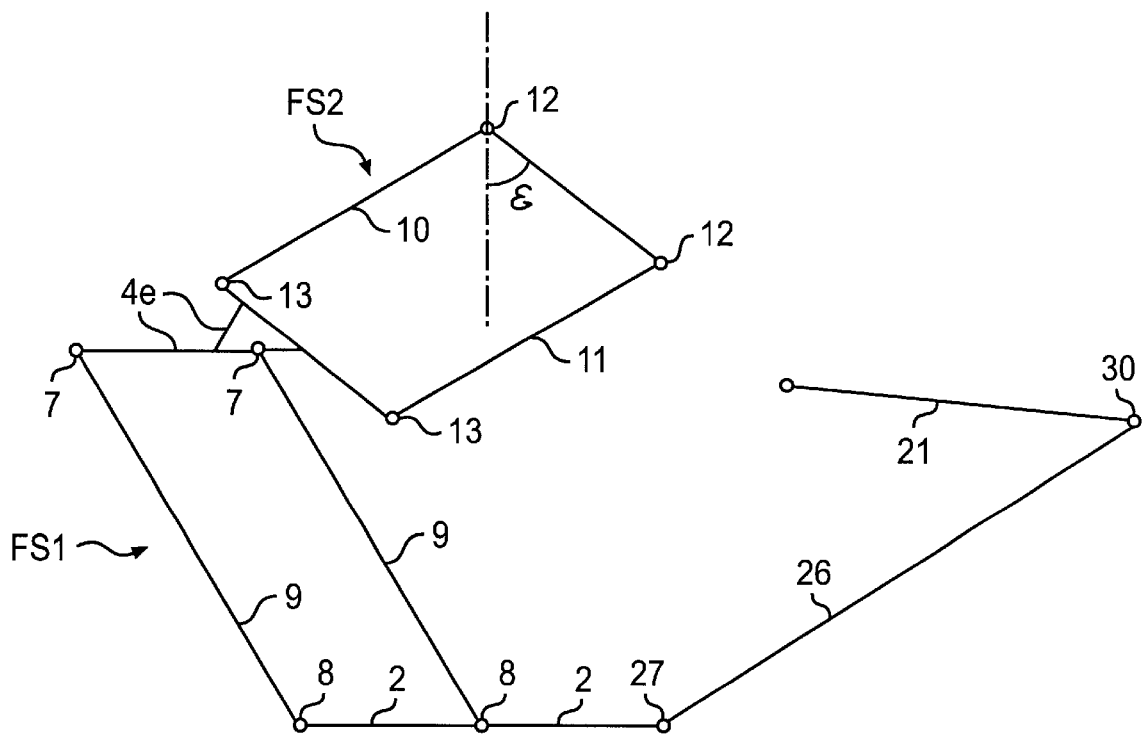
FIG. 17 is a side view illustrating a possible coordination of the first and second four-links systems.

The device according to the invention as it has been described with the assistance of FIGS. 1–11 involves an extremely great flexibility such that adjustment of the working area may occur. It has already been described that the angle $\alpha$ may be changed as needed. In FIG. 17 it is also illustrated that the angle $\epsilon$, i.e. the orientation of the four-links system FS2 may be changed as needed, in practice between 0 and 360°. In FIG. 10 an angle $\beta$ is indicated, namely the angle between a first line interconnecting the joints 7 of the links 9 and a second line interconnecting the joint 15 of the link 14 with the adjacent joint 7. This angle $\beta$ may be arbitrary within the interval 0–360°, although the reservation is put forth that the angle must be separated from 0°, 180° and 360°. In FIG. 10 also an angle χ, namely the angle between P2 (compare with FIG. 3) and a line interconnecting the upper joints included in some of the two four-links systems FS1 occurring in the example. Besides, an angle δ is illustrated in FIG. 9, the angle being intended to be the angle between the plane of pivoting of FS2 and the plane, in which the upper joints 7, 15 of the links 9, 14 reside. All of these angles α, β, χ, δ, ε may be modified in order to achieve the adaptation of the movement area aimed at and the desired performance of the robot in certain directions.

Furthermore, it is remarked that a further adaptation of the robot structure may be carried out by arranging the planes, in which FS2 and the movable portion 21 pivot, to form an angle relative to each other instead of being parallel as intended in FIGS. 1–4 and 9–11. These two planes are denoted P3 and P4 in FIG. 5. As for instance has been indicated with dashed lines in FIG. 6, these planes could be angled relative to each other such that one border side of the robot would become angled instead of planar. Furthermore, it is pointed out that the arm length of the robot may be different and vary according to the circumstances.

Figure 12:
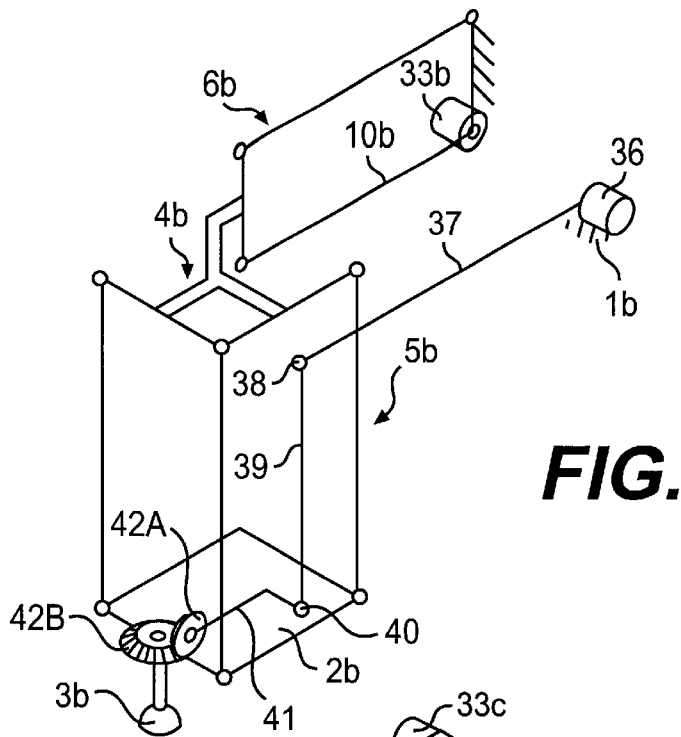
FIG. 12 is a perspective view illustrating an embodiment of a transmission arrangement for force transmission from a drive member on the first element to a driven member on the second element.

In FIG. 12 it is illustrated that a force member 33b is adapted to change the form of the link arrangement 6b by causing the link 10b to pivot. A drive member 36 in the form of a motor is arranged on the first element 1b and drives an arm 37 arranged parallel to the link 10b to pivot, suitable in a plane substantially parallel to the pivoting plane of the link arrangement 6b. The arm 37 is connected via a joint 38 to a link arm 39, which in its turn is connected via a joint 40 to a driven member 42A via a link arm 41. The driven member 42A is adapted to be put into a rotating movement by means of the link arm 41. The driven member 42A is suitably in its turn arranged to put a working member 3b on the second element 2b in rotation. For this purpose the driven member 42A may be included in a suitable gear, for instance an angular gear, together with a further member 42B coupled to the working member 3B. The members 42A and 42B are suitably formed by gear wheels.

In a rest position, the arm 37 is parallel to the link 10b in the link arrangement 6b whereas the link arm 39 in the rest position is parallel to the first and third links in the link arrangement 5b. When the arm 37 and the link arm 39 are located in these rest positions, they will, on pivoting of the links in the link arrangements 5b and 6b, passively follow without the working member 3b being imparted any rotational movement. It is not until the motor 36 provides for pivoting of the arm 37 that a rotational movement is generated and the arms 37, 39 are displaced out of parallelism with links in the respective link arrangements.

The joints 38, 40 must be capable of allowing pivoting in all directions, i.e. that they must comprise at least two degrees of freedom.

Figure 13:
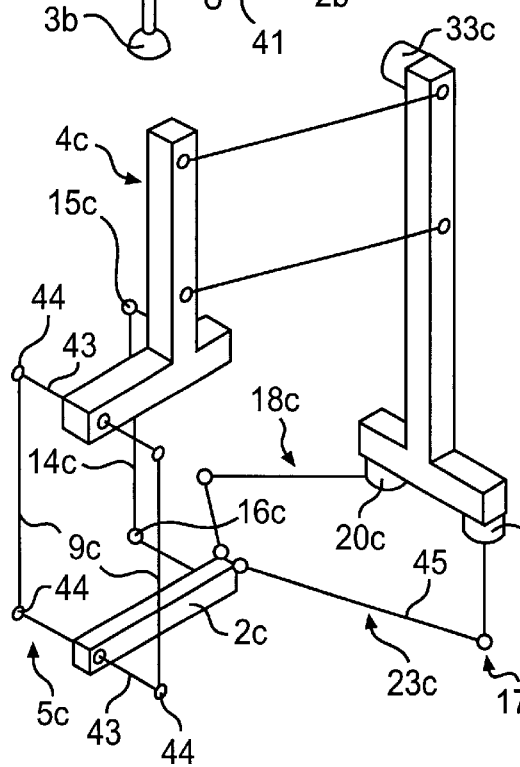
FIGS. 13 and 14 are perspective, diagrammatical views illustrating further robot alternatives.
Figure 14:
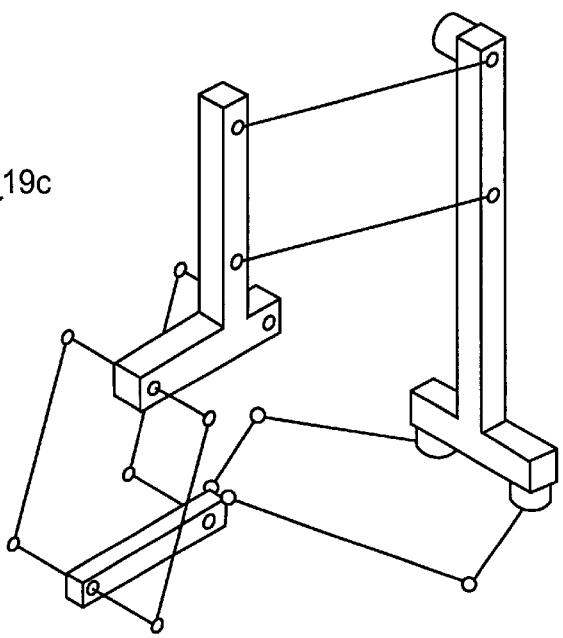

The embodiment according to FIGS. 13 and 14 differs from the previous embodiments as far as the design of the link arrangement 5c and as far as the link arm arrangement 17c are concerned. In this embodiment the links 9c, 14c of the link arrangement 5c form, together with the associated joints 43, 44, 15c, 16c, connections between the connection arrangement 4c and the element 2c, at least one of the connections being rotationally rigid, i.e. capable of transferring a torque about an axis parallel to the link in the connection. In practice, there are in the embodiment according to FIGS. 13 and 14 three such connections. In case one of them is torque transmitting in the mentioned manner, also the element 2c will also be locked against rotation about an axis parallel to a link contained in the connection. This means, as will be described more closely hereinafter, that the force applying arrangement 17c may be simplified so that it does not have to lock the second element 2 against rotation as in the embodiments according to FIGS. 2 and 9.

More specifically, the two first links 9c are interconnected by means of connecting parts 43, which are rotatably connected to the connection arrangement 4c and the element 2c respectively with one and not more than one degree of freedom. The two first links 9c are connected, with one and not more than one degree of freedom, to the connecting part 43 via hinges 44 forming axes of rotation directed substantially perpendicularly to the axes of rotation of the connecting parts 43 relative to the connecting arrangement 4c and the element 2c. The two links 9c are connected to the connecting parts 43 by means of the joints 44 about the axes of rotation of the connecting parts 4, so that accordingly a rotation of the connecting parts 43 relative to the connecting arrangement 4c and the element 2c forcibly causes the link arms 9c to participate in this rotation. As appears from a comparison with FIG. 14, it can be seen that the links 9c are free to pivot in parallelism with a plane extending through the axes of rotation of the connecting parts 43. The design of the third link 14c is in this connection not critical. The joints 15c and 16c respectively relative to the connection arrangement 4c and the element 2c may be of an arbitrary nature as long as they present two or three degrees of freedom in accordance with that discussed with the assistance of the embodiment according to FIGS. 1–4.

The connecting parts 43 and the arrangement of the links 9c on these parts so as to be prevented from rotation relative to the parts means that the link arrangement 5c secures the element 2c as to an additional degree of freedom beyond what is the case with respect to the link arrangement 5 in the embodiment according to FIGS. 1–4. This means that the link arm arrangement 23c in FIGS. 13 and 14 may be designed, in place of the more complex parallelogram configuration used in the previous embodiment, as a simple link arm 45, i.e. that the two force applying arrangements 17c and 18c only need to be designed so as to be capable of actuating the link arrangement 5c and/or the element 2c such that the desired pivoting thereof in two dimensions relative to the connection arrangement 4c may be achieved.

Figure 25:
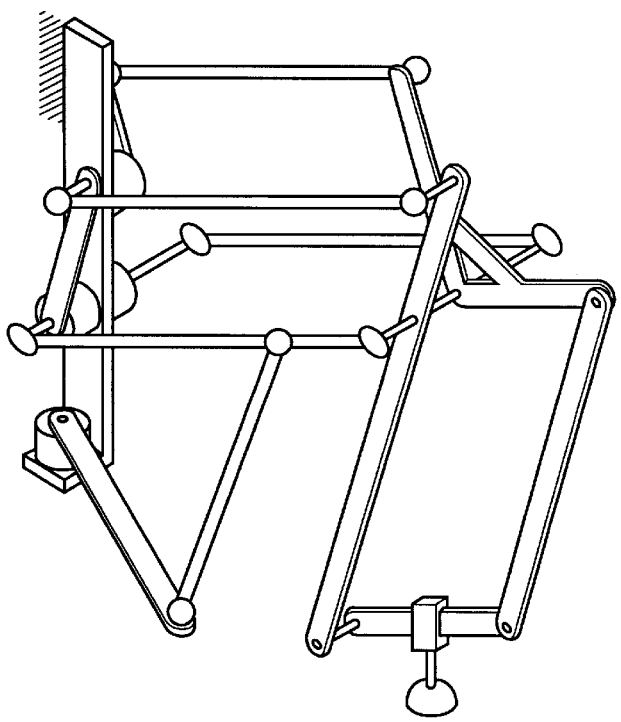

It is illustrated in more detail in FIG. 25 how the embodiment according FIGS. 13 and 14 may be designed. More specifically, the connecting parts 43 are rotatably supported relative to the connection arrangement 4c and the second element 2c about substantially parallel axes 74. The links 9c are pivotably connected to the connecting parts 43 via joints 75 about axes 76 directed substantially perpendicularly to the axes 74 of rotation of the connecting parts 43 relative to the connection arrangement 4c and the second element 2c. Accordingly, the links 9c may pivot relative to the connecting parts 43 in planes parallel to a plane through both axes 74. On the other hand, the joints 75 are designed so that the links 9c may not be rotated relative to the connecting parts 43 about axes parallel to the links 9c. Thus, connections preventing relative rotation about such axes are present between the connection arrangement 4c and the element 2c.

Figure 28:
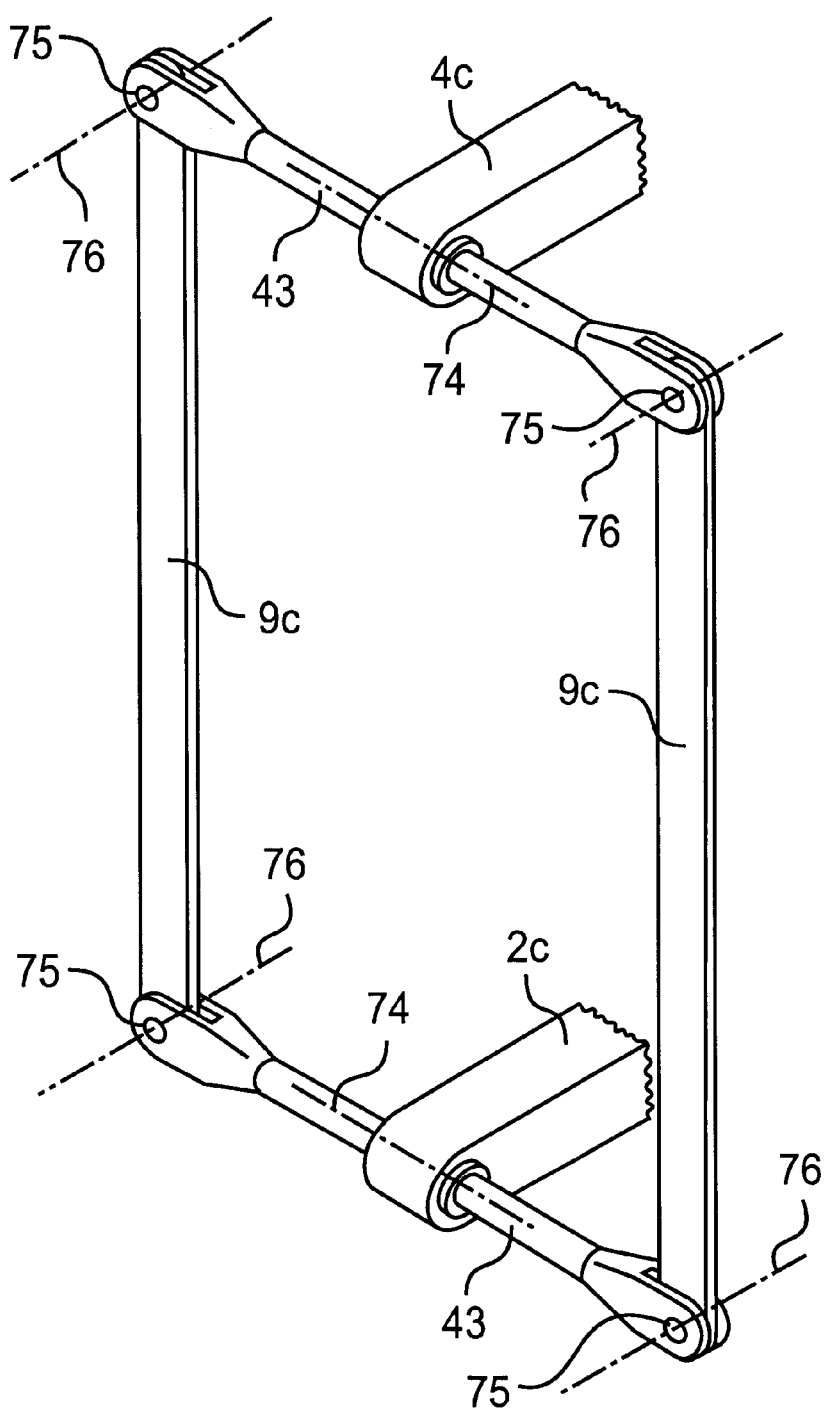
FIG. 28 is a detailed view in perspective illustrating a possible design in the embodiment according to FIGS. 13 and 14.

It is pointed out with regard to FIG. 28 that it would be sufficient in order to achieve the discussed connection preventing relative rotation between the connection arrangement 4c and the element 2c that only one of the links 9c would be connected to the two connecting parts 43 via joints 75 forming a connection preventing relative rotation about an axis parallel to the link 9c in question. The other link 9c could, accordingly, be connected to the connecting parts 43 via joints allowing, in addition, rotation about an axis parallel to the last mentioned link. However, a more stable embodiment is obtained in case both links 9c are coordinated with the connecting parts 43 in a manner which prevents relative rotation.

Figure 29:
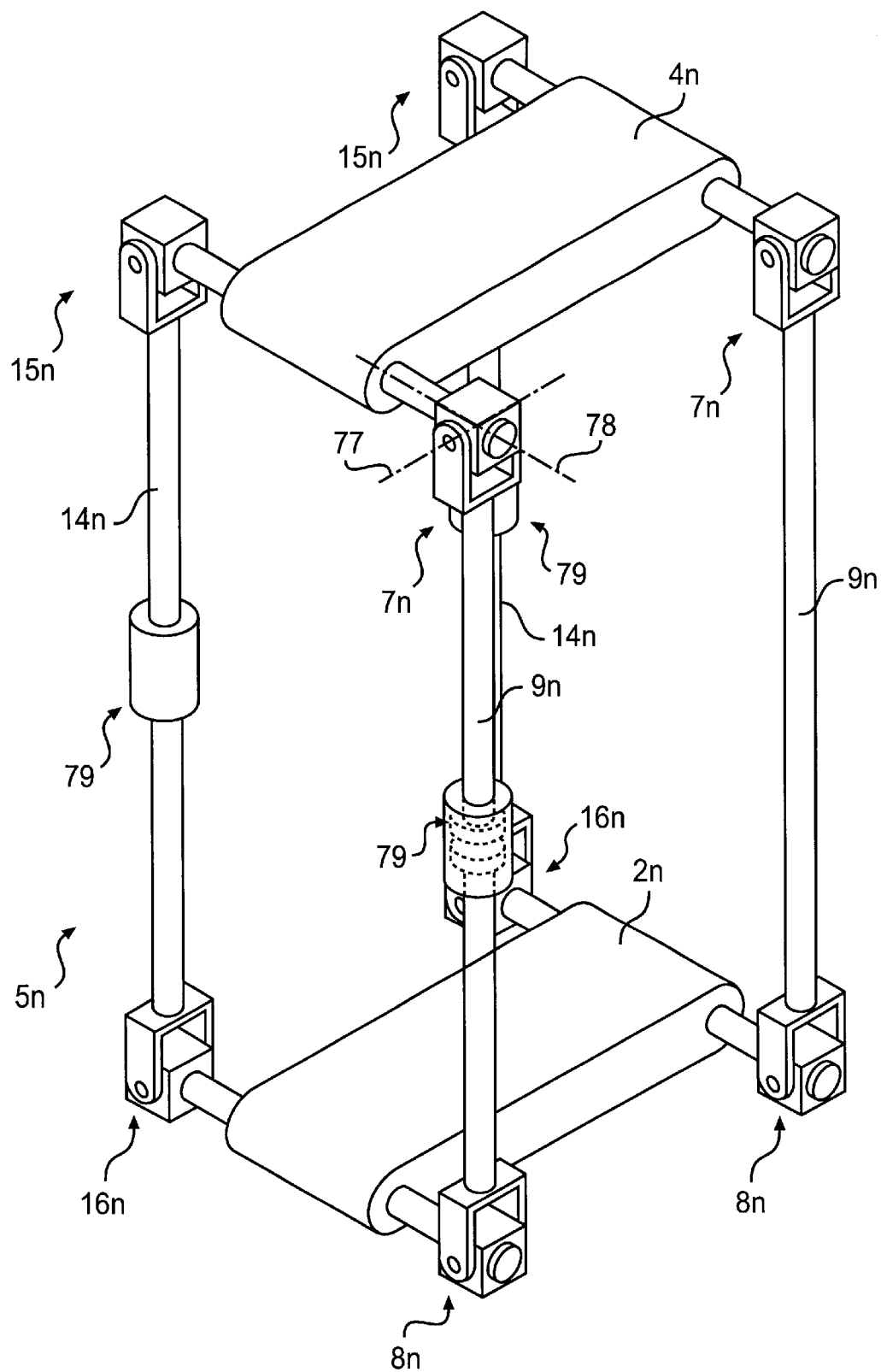
FIG. 29 is a perspective view illustrating alternative designs with respect to the first link arrangement.

In this connection reference is made to FIG. 29 showing an alternative as far as the link arrangement 5n is concerned. In this case four-links are illustrated between the connection arrangement 4n and the second element 2n, two of these links being conceived to consist of first links 9n whereas two are formed by third links 14n. The joints 7n, Bn, 15n and 16n of the links 9n, 14n are here all of a similar embodiment; more specifically the joints provide pivotability of the individual link relative to both of the connection arrangement 4n and the element 2n in all directions. This is achieved by the joint comprising freedom to pivoting about two axes 77, 78 forming an angle between themselves. The individual joint may have the character of a cardan joint or the like. Such a type of joint does not give freedom for rotation of the link in question about an axis parallel with itself relative to the connection arrangement 4n and the element 2n. Thus, when the link in question is of an embodiment preventing relative rotation, a connection preventing relative rotation between the connection arrangement 4n and the element 2n is formed. The link 9n illustrated mostly to the right in FIG. 29 represents such an embodiment preventing relative rotation. When at least one of the connections consisting of link and associated joints is designed accordingly, the force applying arrangements 17c and 18c may, similar to what is illustrated in FIGS. 13 and 14, be designed comparatively simply and so that they only locate the element 2 in space; none of the force applying arrangements 17c, 18c must in such a case be designed to eliminate the degree of freedom consisting in a possibility of relative rotation between the connection arrangement 4n and the element 2n.

However, FIG. 29 also illustrates an example where the three other links comprise rotary connections 79 between their joints present at the ends of the links, the rotary connections 79 allowing rotation of link parts present on either sides of the rotary connection relative to each other about axes of rotation substantially parallel to the links. More specifically, those rotary connections 79 should be designed to be able to transfer compression and traction forces along the links. The only relative freedom of movement intended, is, accordingly, a pure rotation about axes parallel to the links. In case all links comprise a possibility for rotation formed by such rotary connections 79 or in some other way, there is also a possibility for rotation between the connection arrangement 4n and the element 2n about axes parallel to the links. Removal of the rotary connection 79 with respect to one of the links is sufficient to lock against such rotation. Of course the rotary connections 79 may, in a manner which already has been discussed, be replaced by joints at at least one end of the links in question being imparted a third degree of freedom consisting in rotation, for instance by the joints being designed as ball joints.

Figure 15:
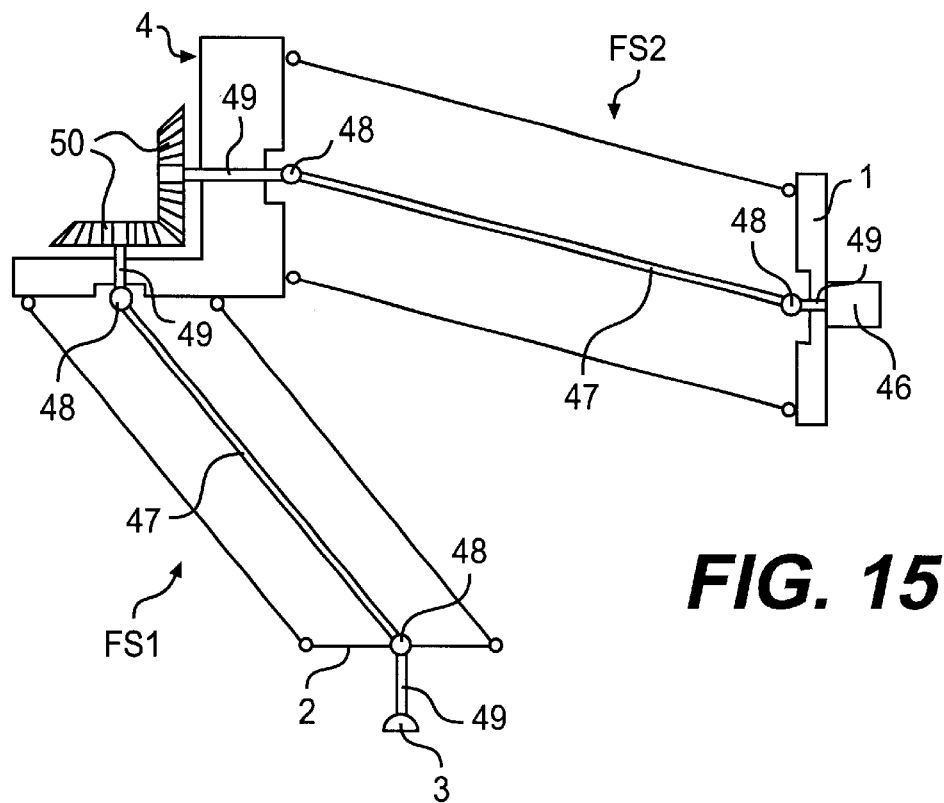
FIG. 15 is a side view of an alternative to the transmission illustrated in FIG. 12.

In FIG. 15, the two four-links systems FS1 and FS2 are illustrated in connection with a transmission arrangement suitable for an angled, in the example a right angle, relation by means of the connection arrangement 4d. The transmission arrangement illustrated in FIG. 15 is intended for force transfer from drive member 46 on the first element 1 to a driven member, for instance a working member 3, on the second element 2. The transmission arrangement comprises axles 47 extending substantially parallel to the links in the parallelogram shaped first and second four-links systems FS1 and FS2, the axles 47 being by means of cardan joints 48 coupled to shorter axle pins 49 connected to the drive motor 46, the working member 3 and, in the example, gear wheels included in an angular gear 50. These gear wheels are rotatably supported on the connection arrangement 4. Thus, a rotational movement may be transferred from the motor 46 to the working member 3. In use of the transmission arrangement in the embodiment according to FIGS. 9–11 the angular gear 50 could have been avoided and instead axles analogous to those denoted 47 could have been coupled together directly in the vicinity of the connection arrangement 4a by means of a cardan joint. In such a case an intermediate axle piece coupled to the axles 47 via cardan joints could, possibly, in such a case be present between axles corresponding to those denoted 47 in FIG. 15, the purpose of the axle piece being to bridge a possible spacing of the link arrangements 5a and 6a from each other by means of the connection arrangement 4a.

Figure 16:
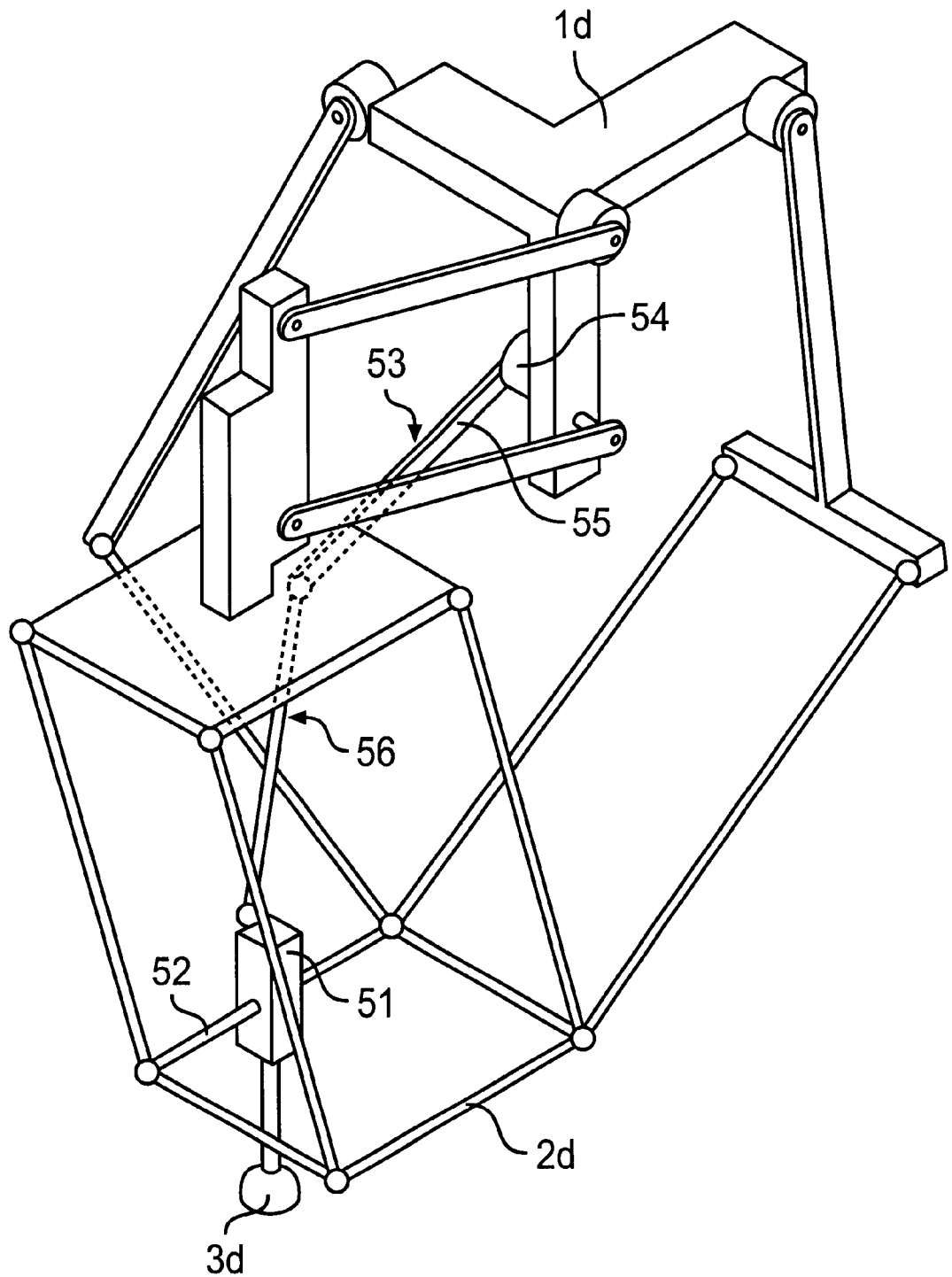
FIG. 16 is a perspective view illustrating a working member arranged on a carrying arrangement movable relative to the second element.

FIG. 16 illustrates a robot variant substantially similar to the one described with the assistance of FIGS. 1–4. The notable difference in this connection is that here a carrying arrangement 51 for a working member 3d is hingedly connected to the second element 2d. A pivot axis for the carrying arrangement 51 is denoted 52 in FIG. 16. A fifth force applying arrangement 53 serves for pivoting the carrying arrangement 51 about the axis 52. This arrangement 53 comprises a force exerting member 54 arranged on the first element 1d. This force member 54, comprises a stationary portion rigidly connected to the element 1d and movable portion 55 adapted to actuate the carrying arrangement 51 to rotate by means of a link arm arrangement 56 comprising one or more link arms.

FIG. 17 illustrates a robot variant in side view. The purpose is to illustrate that the four-links systems FS1 and FS2 formed by the link arrangements may be connected to each other in desired relative positions via the connection arrangement 4e in adjustment to the work tasks to be carried out.

Figure 18:
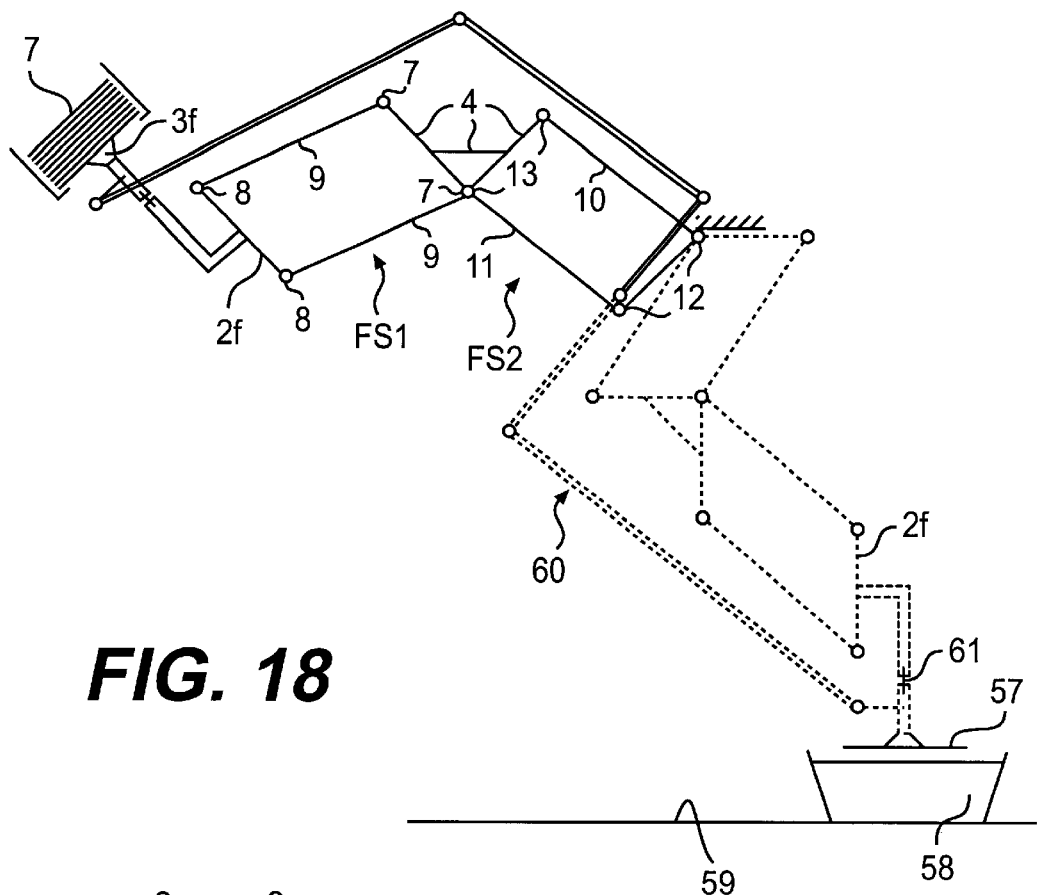
FIGS. 18–23 are side views illustrating different robot variants in different application cases.

FIG. 18 illustrates in side view a robot according to the invention with its four-links system FS1 and FS2 formed by the link arrangements. As can be seen, the embodiment uses tilting of the element 2f as described with the assistance of the embodiment according to FIGS. 1–4, whereby a working member 3f may be brought to fetch objects, for instance cover sheets 57, from a magazine and apply those sheets on a container 58 being in motion on a conveyor 59. In this case the working member 3f has the character of a suction grip means, which by means of a force applying arrangement 60 comprising a force exerting member and a link arms system may be rotated about an axis 61 relative to the element 2f. Due to this rotational movement, the orientation of the working member 3f relative to the container 58 may be adjusted.

Figure 19:
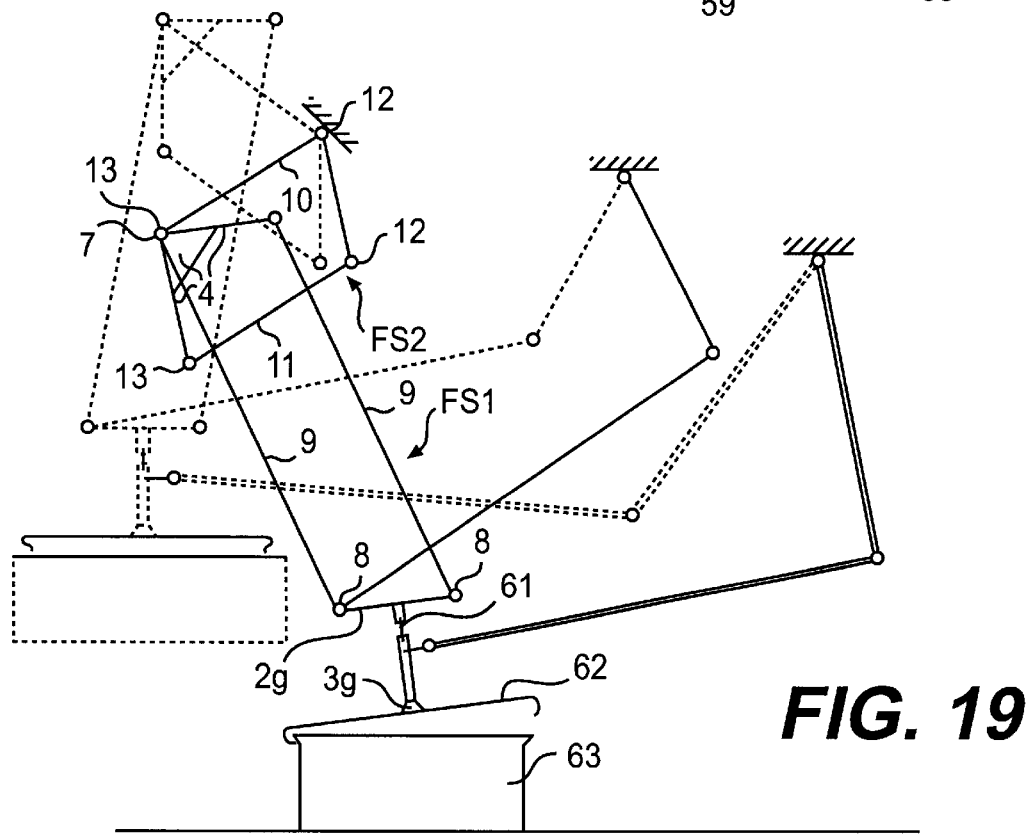

FIG. 19 illustrates a robot application with a somewhat different mutual coordination and design of the link arrangements forming the four-links systems FS1 and FS2. Also, here tilting of the element 2g is used, in this case to simplify the application of a lid 62 on a container 63. As in the embodiment according to FIG. 18, measures are also here being taken to rotate the working member 3g about an axis 61g relative to the element 2g.

Figure 20:
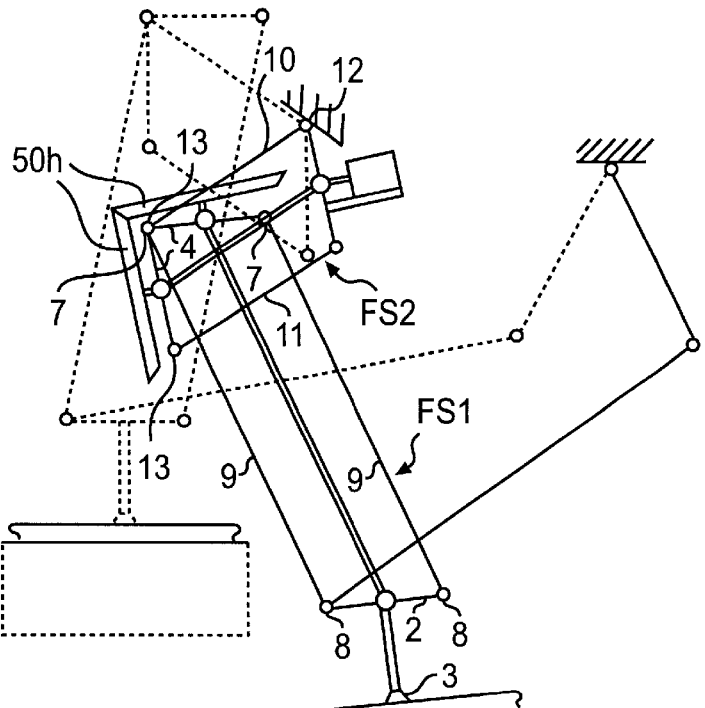

FIG. 20 illustrates an embodiment similar to the one in FIG. 19 with an additional transmission arrangement similar to the one in FIG. 15 with exception of the fact that here the angular relation between the link arrangements forming the four-links systems FS1 and FS2 is somewhat different and as a consequence thereof, the angular gear 50h is here somewhat modified.

Figure 21:
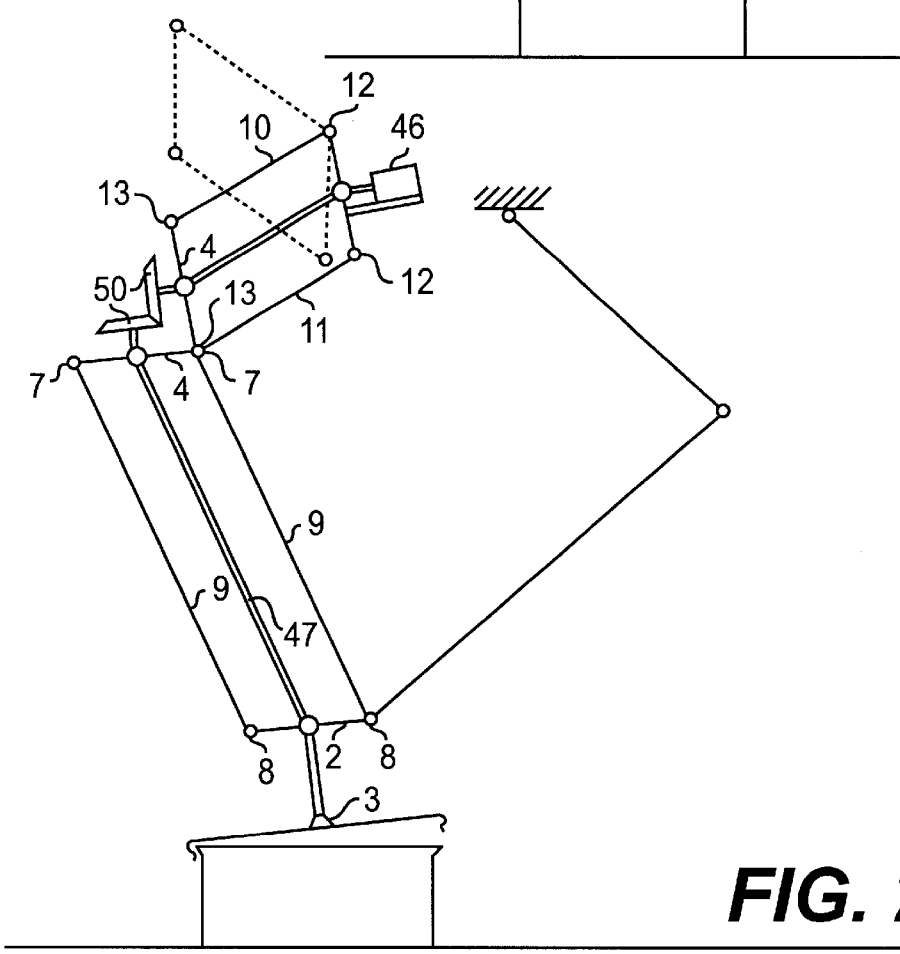

FIG. 21 illustrates an application similar to FIG. 20 but with a design more closely resembling the one in FIG. 15.

Figure 22:
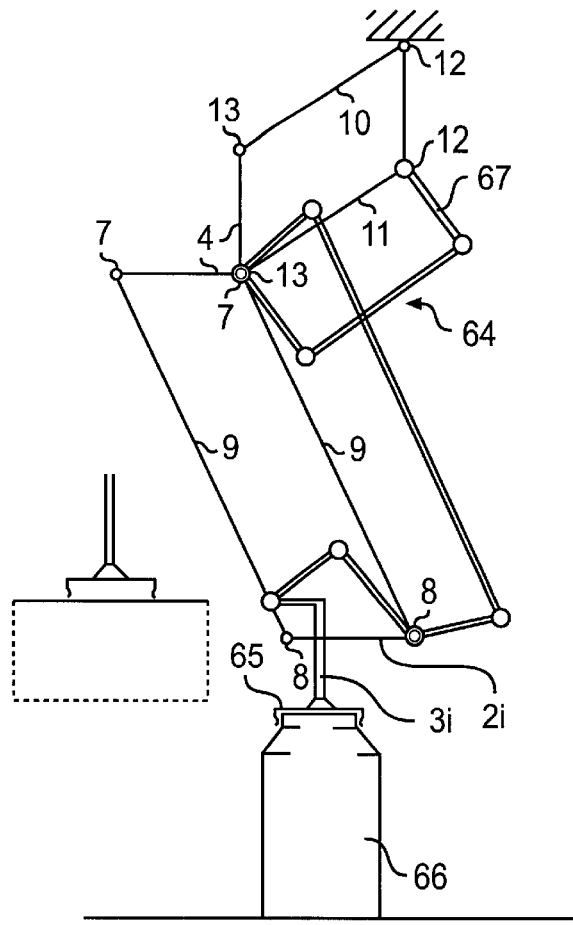

FIG. 22 illustrates that a link arm system 64 may be used for obtaining a rotational movement of a working member 3i, which is rotatably supported on the element 2i. The working member 3i is intended to apply a lid 65 on a can 66 by rotation as a consequence of the fact that a pivoting movement is imparted to a link arm 67 by means of a force member, the pivoting movement in its turn being transferred via further link arms contained in the link arm arrangement to, finally, the working member 3i in order to impart to the same a rotational movement.

Figure 23:
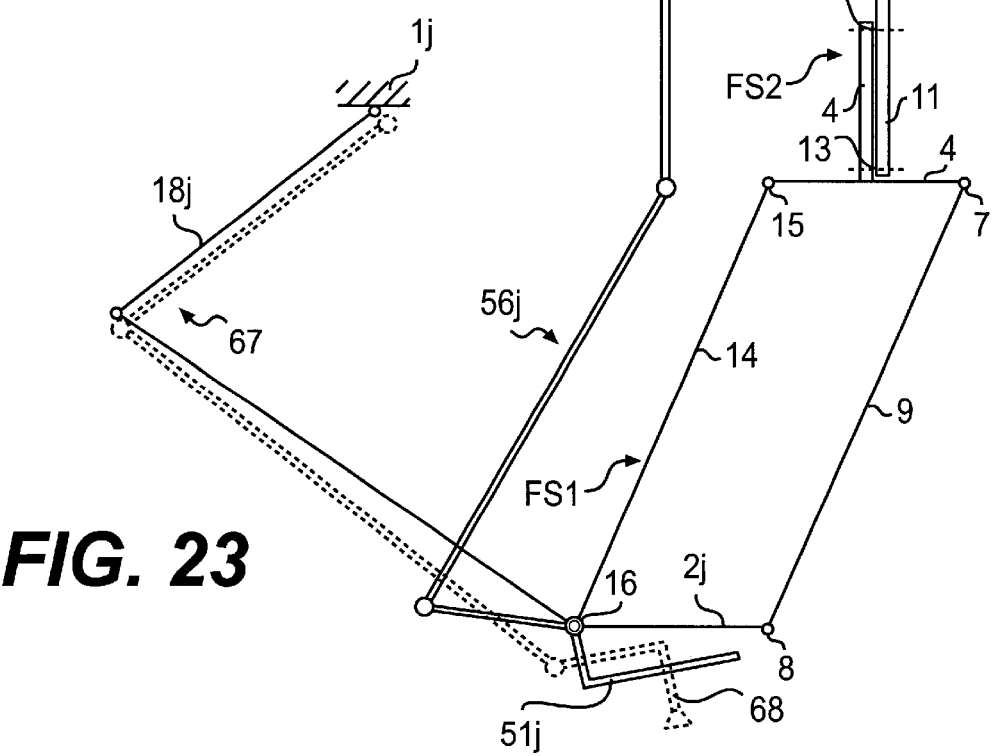

FIG. 23 illustrates that a force exerting member 54j of a force applying arrangement, similar to the embodiment according to FIG. 16, may cause a carrying arrangement 51j to pivot (tilt) relative to the element 2j via a link arm system 54j. A force applying arrangement 18j of a kind already described is illustrated in full lines. However, in dashed lines a force applying arrangement 67 comprising a link arm arrangement and a force exerting member, not illustrated, arranged on the first element 1j in order to actuate a further member 68, which may be formed by a further carrying arrangement or a working member, into movement relative to the already mentioned carrying arrangement 51j is illustrated. For this purpose the component 68 is conceived to be rotatably arranged on the carrying arrangement 51j.

According to a variant the components 51j and 68 could form a gripping arrangement. Otherwise the carrying arrangement 51j could simply be used for achieving tilting of a carrying arrangement for a working member in a direction transverse to the four-links system FS2. If the force exerting member 34 (see FIG. 2) is used at the same time for tilting of the element 2, a robot with 6 degrees of freedom is obtained.

Figure 24:
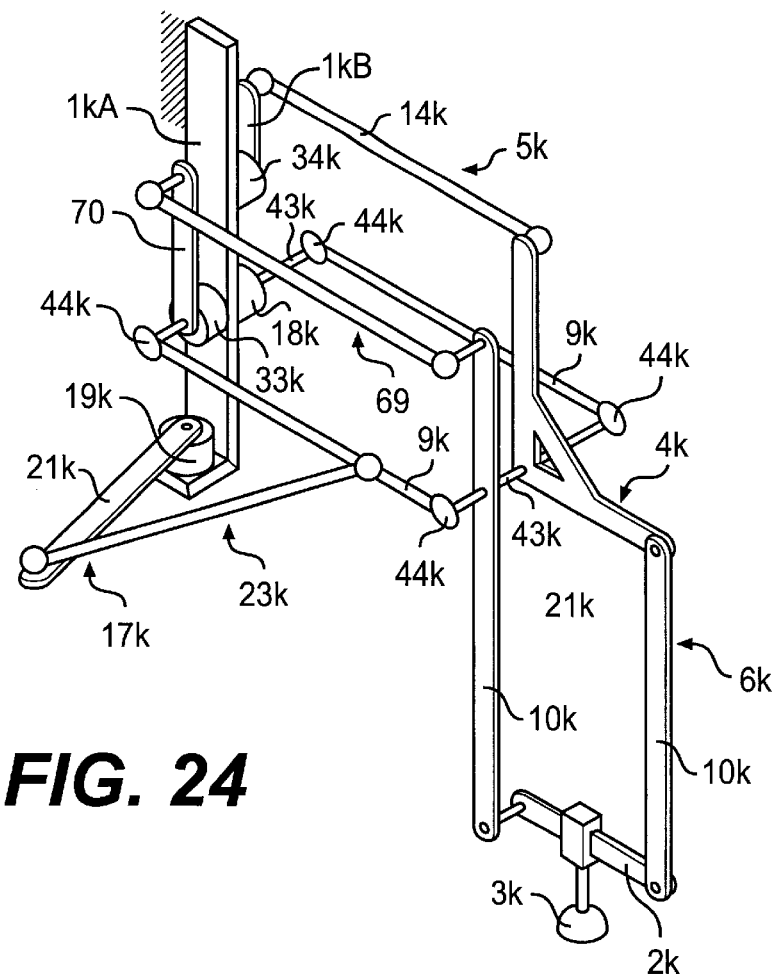
FIGS. 24 and 25 are diagrammatical perspective views illustrating a further robot alternative.

FIGS. 24 and 25 illustrate a variant where the link arrangement 6k is provided between the connection arrangement 4k and the second element 2k. The first link arrangement 5k is provided between the connection arrangement 4k and the first element 1k. The second element 2k is intended to carry a working member 3k.

First and second force applying arrangements 17k, 18k are adapted to cause the first and third links 9k and 14k of the link arrangement 5k to pivot relative to the element 1k.

The first and second force applying arrangements 17k, 18k comprise each a force exerting member 19k and 18k respectively, which both have a stationary portion rigidly connected relative to the first element 1k and a movable portion. The movable portion is adapted to actuate the first and third links 9k, 14k to pivot relative to the first element 1k. The force member 18k has its movable portion connected to a connecting part 43k so as to be prevented from relative rotation with respect thereto. By rotating this part 43k relative to the element 1k, the links 9k, 14k oriented substantially horizontally in FIG. 24 will be caused to pivot in the vertical plane. From this it is apparent that the links 9k are connected to the connecting part 43k so as to be secured relative thereto against pivoting about the axes of rotation of the connecting part 43k. On the other hand, the links 9k are connected to the connecting part 43k via joints 44k allowing pivoting of the links 9k about axes substantially perpendicular to the longitudinal axis of the connecting part 43k. Thus, the links 9k may be pivoted in the horizontal plane relative to the connecting part 43k by means of the joints 44k. This occurs by means of the force member 19k, the movable portion 21k of which is connected to one of the links 9k via a link arm 23k.

The links 9k are interconnected by means of a further connection part 43k at their ends facing away from the first element 1k. This connecting part 43k and the links 9k are connected so as to prevent relative rotation in which the links accompany the part 43k on rotation thereof, and conversely, such that the part 43k is rotated on pivoting of the links 9k. Also, the joints 44k between the links 9k and the outermost of the connecting parts 43k provide for only one degree of freedom, namely rotation about axes substantially perpendicular to the longitudinal direction of the connecting part 43k so that pivoting of the links 9k in the horizontal plane is allowed.

As far as the links 9k and the connecting parts 43k are concerned it is pointed out that the same considerations that have been discussed with the aid of FIGS. 13–14 and 28–29 also are valid here.

A third force applying arrangement 33k is adapted to cause the second links 10k, 11k to pivot relative to the connection arrangement 4k. The third force applying arrangement 33k comprises a stationary portion rigidly connected to the element 1k and a movable portion adapted to actuate, via the link arm arrangement 69 denoted 10k, of the links in the link arrangement 6k. This link 10k is pivotably supported relative to the connection arrangement 4k. In the example it is illustrated that the pivotable bearing is realized by the link 10k being pivotably journalled about the part 43k which is designed as an axle. The connection arrangement 4k is in its turn also freely pivotably supported about the connection part 43k.

The arrangement 33k comprises a force exerting member with a stationary portion rigidly secured to the element 1k and a movable portion 70 having the character of an arm and being adapted to subject, via at least one link contained in the link arm arrangement 69, the link 10k to a pivoting actuation, which in turn changes the form of the link arrangement 6k and causes displacement of the element 2k.

The links in the four-links system 6k forms a parallelogram like the links 9k and the connecting axles 43k. It is suitable but not necessary that the link arm 69 forms, together with one of the links 9k, a parallelogram. The and the same is also applicable with respect to one of the links 9k and the third link 14k.

The first element 1k is formed by two parts, which are hingedly connected to each other. More specifically, a fourth 34k of the force applying arrangements is adapted to pivot a second part 1kB relative to a first 1kA of the parts. The second part 1kB is, via the third link 14k, connected to the connection arrangement 4k. The arrangement 44k comprises a force exerting member having a stationary portion rigidly connected to the part 1kA and a movable portion comprising one degree of freedom relative to the stationary portion. The part 1kB has the character of a link pivotable about an axis defined by the force member 34k. By pivoting the link 1kB by means of the force member 34k the connection arrangement 4k may be pivoted via the third link 14k, about the connecting part 43k. This and this causes a tilting of the element 2k in space. However, when the link 1kB is held stationary by means of the force member 34k such that the link 14k forms, with the links 9k, a parallelogram, pivoting of the link 70 will give rise to a change of the form of the parallelogram 6k while maintaining a constant orientation of the element 2k.

It is pointed out that the pivoting axis of the link 1kB could be made concentric with the connecting axle 43k, which would mean that the link 14k, also when the link 1kB is pivoted out of its basic position, forms a parallelogram with one of the links 9k so that on three-dimensional pivoting of the links 9k and 14k by means of the force-exerting members 18k and 19k, the orientation of the element 2k in space is maintained.

For the rest it is pointed out that with the assistance of software compensation for non-ideal parallelogram transmissions, the pivoting axes for 10k and 4k may be separated from each other and also separated from, and non-parallel with, the axis of rotation of the part 43k.

It is pointed out that in the embodiment according to FIGS. 24 and 25, the connecting part 43k must be able to pass freely through the force-exerting member 33k and the link 70 so that operation of the force-exerting member 33k does not involve any actuation of the connecting part 43k.

Figure 26:
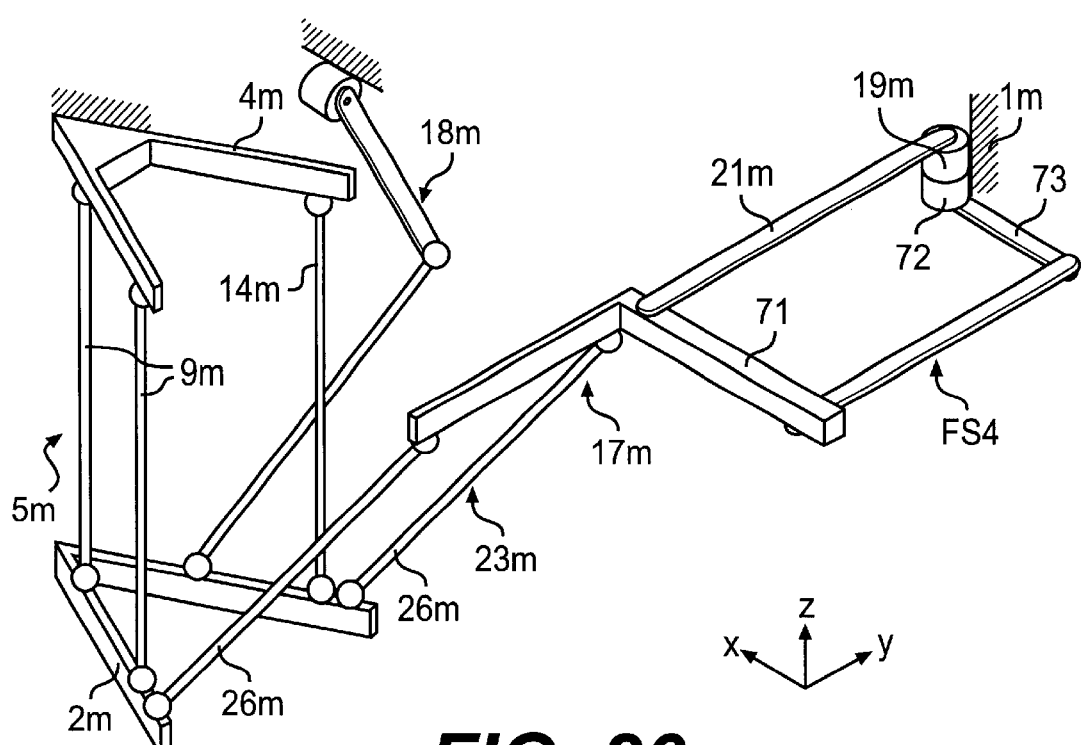
FIGS. 26 and 27 are perspective views illustrating parts of a further robot alternative in two different positions.
Figure 27:
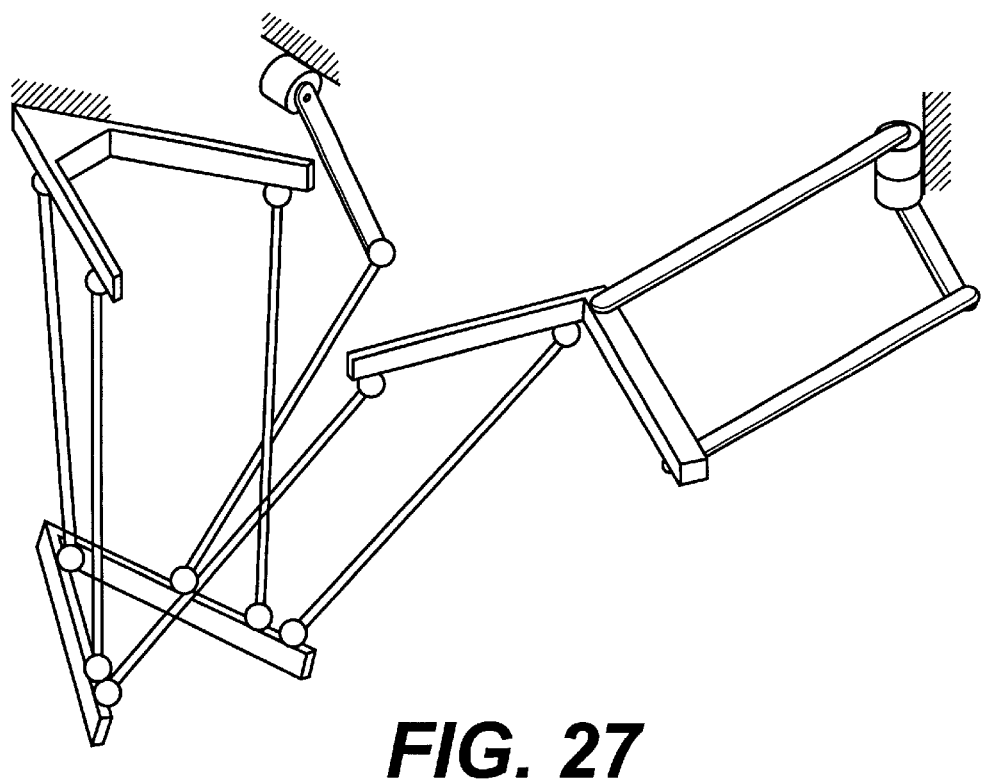

Finally, FIGS. 26 and 27 illustrate a first link arrangement 5m in the form of the links 9m and 14m extending between the connection arrangement 4m and the second element 2m. Here it can be seen that the joints of the links 9m and 14m are not in a right-angled relation but rather in a relation which viewed from above is similar to an acute triangle. The second link arrangement 6 is not illustrated in FIGS. 26 and 27 but it is of course intended to also be included also here. The force-applying arrangement 18m is analogous to that previously described. No further comments are, accordingly, given here. The difference consists in the force member 19m in the first force-applying arrangement 17m having its movable portion rigidly connected to a link 21m in a fourth four-links system FS4, the outermost link 71 facing away from the first element 1m forming a connection to the link arm arrangement 23m, which similar to the embodiment in FIGS. 1–4 consists of two link arms 26m designed as a parallelogram. A further force-applying arrangement 72 comprises a force-exerting member 72 arranged to pivot a link 73, which is opposite to the outermost link 71, of the four-links system FS4 relative to the first element 1m in order to skew, in a manner indicated in FIG. 27, the four-links system FS4, the associated link arm arrangement 23m and thereby also the link arrangement 5m.

The skewing technique described with assistance of FIGS. 26 and 27 may also be applied where a smaller rotational movement between the elements 2m and the connection arrangement 4m is required in order to adjust the working member in question to a work task. It is pointed out that FS4 in FIGS. 26 and 27 operates in the XY-plane. FS4 could instead be inclined; for instance so that FS4 would be substantially parallel to planes, in which the link arms 26m reside.

Common to all described embodiments is that a suitable control unit, particularly in the form of a computer, is adapted to control the force-exerting members of the various robot embodiments for the purpose of causing the second element 2 or members coupled thereto directly or indirectly to move in desired paths.

POSSIBLE MODIFICATIONS

It is evident that the invention is not only restricted to the embodiments discussed herein above. Thus, detail adaptations of the embodiments may be carried out depending on the circumstances without leaving the inventive concept disclosed herein.

What is claimed is:

1. A device comprising:
   a single unitary connection element forming a connection between a first link arrangement and a movement arrangement;
   said movement arrangement being provided between said connection element and a first element;
   said first link arrangement being provided between said connection element and a second element;
   said first link arrangement including a four-links system comprising at least two first links connected at a first pair of joints to said connection element so as to be pivotable relative to said connection element, and connected at a second pair of joints to said second element so as to be pivotable relative to said second element; and
   actuating arrangements for actuating said movement arrangement and said first link arrangement to change a position of said second element relative to said first element;
   wherein:
      said first link arrangement further includes a third four-links system comprising:
         at least a third link connected at a third pair of joints so as to be pivotable relative to said connection element and said second element;
         said first pair of joints and a first one of said third pair of joints, and said second pair of joints and a second one of said third pair of joints, respectively, being disposed in a triangular configuration; and
         said second element is pivotable in all directions.

2. The device of claim 1, wherein said first and third links are substantially equal in length.

3. The device of claim 1, wherein said first and third links are substantially parallel.

4. The device of claim 1, wherein said movement arrangement allows said connection element to move relative to said first element while maintaining a substantially constant inclination of said connection element relative to said first element.

5. The device of claim 1, wherein said movement arrangement comprises a second link arrangement including at least a second link pivotable with respect to said connection element and said first element.

6. The device of claim 5, wherein said second link arrangement includes a second four-links system comprising at least two of said second links.

7. The device of claim 6, wherein said two second links are substantially equal in length.

8. The device of claim 6, wherein said two second links are substantially parallel.

9. The device of claim 6, wherein said actuating arrangements include a force exerting member for causing said second links to pivot relative to said first element.

10. The device of claim 5, wherein:
    said first element comprises a first part hingedly connected to a second part; and
    said actuator arrangements include a force exerting member for pivoting said second part relative to said first part;
    said second part forming an additional link in said second link arrangement.

11. The device of claim 1, wherein said second element is rotatable relative to said connection element.

12. The device of claim 1, wherein at least one of said first and third links resists rotation of said second element.

13. The device of claim 1, wherein said second element carries a working member for handling objects.

14. The device of claim 1, wherein said actuating arrangements comprise first and second force applying arrangements for causing said first and third links to pivot relative to said connection arrangement.

15. The device of claim 14, wherein:
    said first force applying arrangement comprises:
       a first force exerting member including a first stationary portion fixed to said first element;
       a first movable portion having one degree of freedom relative to said first stationary portion; and
       a first link arm arrangement connected to said second element;

said second force applying arrangement comprises:
- a second force exerting member including a second stationary portion fixed to said first element;
- a second movable portion having one degree of freedom relative to said second stationary portion; and
- a second link arm arrangement connected to said second element; and said first force applying arrangement actuates said second element in a direction opposing a direction in which said second force applying arrangement actuates said second element.

16. The device of claim 15, wherein said first link arm arrangement comprises at least two link arms hingedly connected to said first movable portion and said second element via first pivoting joints making said link arms pivotable in all directions relative to said first movable portion and said second element.

17. The device of claim 15, wherein said second link arm arrangement includes second pivoting joints making said second link arm arrangement pivotable in all directions relative to said second movable portion and said second element.

18. The device of claim 17, wherein said second pivoting joints allow said second link arm arrangement to rotate about an axis substantially parallel to said second link arm arrangement.

19. The device of claim 15, wherein at least one of said first and second force exerting members is a motor.

* * * * *